Patented Apr. 16, 1946

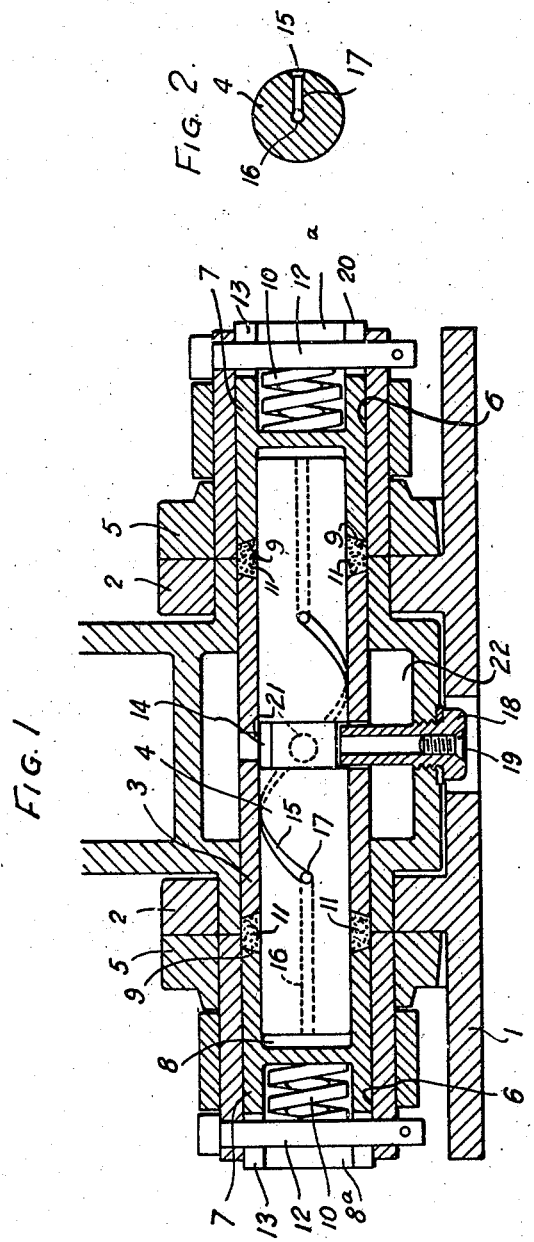

2,398,631

UNITED STATES PATENT OFFICE 2,398,631

ENDLESS TRACK FOR VEHICLES

Edward Hammond Whalley Foot, Beaconsfield, England, assignor to The Tillage & Sub-Soiling Company Limited, Beaconsfield, England Application May 30, 1944, Serial No. 538,020
In Great Britain June 25, 1943

4 Claims. (Cl. 74—257)

The present invention relates to an endless track for vehicles, the tracks being of the kind comprising a plurality of mutually hinged track plates provided with hinge pins.

The main object of the present invention is to provide efficient means for lubricating the hinge pins.

According to a further object of the invention the pivot pin connecting adjacent links of an endless track is maintained in an oil bath by means of a sleeve surrounding the central portion of the pin and recessed caps fitting over the ends of the pin forming with the adjacent parts of the pin an oil chamber at each end of the pin.

Another object of the invention is to provide means for urging the caps into engagement with the packing glands as wear of the glands takes place.

A still further object of the invention is to provide means for securing the end caps against rotation relative to the pin whilst permitting relative axial movement of the caps.

The invention is illustrated in the annexed drawing, in which:

Fig. 1 is an elevation, partly in section, of part of an endless track and

Fig. 2 is a section through the hinge pin.

As shown in the accompanying drawing, the track plate 1 is formed with lugs 2 apertured to receive the sleeve 3 of a hinge pin 4. The outer lugs 5 of an adjacent track plate each has an aperture 6 in which a bush cap 7 is arranged.

The inner end of each bush cap 7 has a recess 8 to receive the end of the pin 4 and the outer end has a recess 8a to house a spring 10. Gland packings 11 are interposed between the sleeve and the inner edge portions of the caps which are urged by a spring 10 to engage gland packings 9. The spring 10 is held in place by a bolt 12 secured to the lugs of adjacent links and extends through slots 13 in the cap 7 thereby preventing rotation of the cap without interfering with its axial movement. The bolt 12 also serves as an abutment for the spring 10. The recess 8 forms an oil chamber and a housing into which the end of the pin 4 projects.

The pin 4 is formed with an annular groove 14, an external sinuous longitudinal groove 15, leading from the groove 14, a central longitudinal groove or vent 16 and a passage 17 connecting the grooves 15 and 16.

A bolt 18 extends through the sleeve 3 and its inner end enters the annular groove 14 of the pin 4 to prevent lateral axial movement of the pin whilst permitting rotary movement thereof. The bolt 18 is hollow to permit the injection of oil through the grooves 14, 15, 16 and 17 into the oil chambers 8. The injection hole is normally closed by a screw 19. The sleeve has a series of apertures 2 communicating with an annular oil reservoir 22 which is also filled through the hollow bolt 18.

As the gland packings 11 wear down the caps 7 are urged inwardly by the spring 10. The oil flows through the groove or vent 16 to the annular recess 14 to maintain a bath of oil for the pin 4. The outer ends 20 of the caps 7 project beyond the faces of the lugs 5 and the gradual inward movement of the projecting ends serves as tell-tale devices to indicate the degree of wear of the gland packings 11.

I claim:

1. In an endless track for vehicles, comprising a plurality of track links wherein adjacent links are connected by a pivot pin, means for maintaining the bearing surface of the pin bathed in oil, comprising a sleeve surrounding the central portion of the pin, two caps each having an inner recess fitting over the opposite ends of the pin, a packing gland interposed between the ends of the sleeve and each cap, an outer recess in each cap, a spring in each outer recess urging the caps into engagement with the packing glands an oil chamber at each end of the pivot pin and formed by the adjacent portions of the pin and cap, and means supplying oil from the oil chambers to the outer longitudinal bearing surface of the pivot pin.

2. In an endless track for vehicles, comprising a plurality of track links wherein adjacent links are connected by a pivot pin, means for maintaining the bearing surface of the pin bathed in oil, comprising a sleeve surrounding the central portion of the pin, two caps each having an inner recess fitting over the opposite ends of the pin, a packing gland interposed between the ends of the sleeve and each cap, an outer recess in each cap, a spring in each outer recess urging the caps into engagement with the packing glands an oil chamber at each end of the pivot pin and formed by the adjacent portions of the pin and cap, longitudinally extending oil channels in the pivot pin feeding oil from the chamber to the outer longitudinal bearing surface of the pivot pin, an annular groove in the outer surface of the pin and means connecting said groove with an oil reservoir adjacent to the centre of the pivot pin.

3. In an endless track for vehicles, comprising a plurality of track links wherein adjacent links are connected by a pivot pin, means for maintaining the bearing surface of the pin bathed in oil, comprising a sleeve surrounding the central portion of the pin, two caps each having an inner recess fitting over the opposite ends of the pin, a packing gland interposed between the ends of the sleeve and each cap, an outer recess in each cap, a spring in each outer recess urging the caps into engagement with the packing glands an oil chamber at each end of the pivot pin and formed by the adjacent portions of the pin and cap, and means supplying oil from the oil chambers to the outer longitudinal bearing surface of the pivot pin slots in each outer recess and bolts secured in said slots and secured to lugs of an adjacent track link for retaining the said springs in the outer recesses of the caps and preventing rotational movement of the caps relatively to the track pin whilst permitting relative movement in an axial direction.

4. In an endless track for vehicles, comprising a plurality of track links wherein adjacent links are connected by a pivot pin, means for maintaining the bearing surface of the pin bathed in oil, comprising a sleeve surrounding the central portion of the pin, two caps each having an inner recess fitting over the opposite ends of the pin, a packing gland interposed between the ends of the sleeve and each cap, an outer recess in each cap, a spring in each outer recess urging the caps into engagement with the packing glands an oil chamber at each end of the pivot pin and formed by the adjacent portions of the pin and cap, longitudinally extending oil channels in the pivot pin feeding oil from the chamber to the outer longitudinal bearing surface of the pivot pin, an annular groove in the outer surface of the pin and means connecting said groove with an oil reservoir adjacent to the centre of the pivot pin a hollow bolt extending into said annular groove for injecting oil to fill said oil reservoir and oil chambers and to restrict axial movement of the pin.

EDWARD HAMMOND WHALLEY FOOT.